United States Patent [19]

Thomas

[11] Patent Number: 4,890,814
[45] Date of Patent: Jan. 2, 1990

[54] DISCHARGE VALVE WITH HANDLE LOCK

[75] Inventor: Larry D. Thomas, Beatrice, Nebr.

[73] Assignee: Hoover Group, Inc., Roswell, Ga.

[21] Appl. No.: 248,593

[22] Filed: Sep. 26, 1988

[51] Int. Cl.⁴ .................. F16K 31/60; F16K 35/00
[52] U.S. Cl. ................................ 251/95; 251/101; 251/144
[58] Field of Search ................... 251/95, 98, 101, 102, 251/103, 104, 107, 110, 144; 137/384, 385, 383; 74/526, 543

[56] References Cited

U.S. PATENT DOCUMENTS

| | | | |
|---|---|---|---|
| 1,124,965 | 1/1915 | Smith | 251/107 |
| 1,295,503 | 2/1919 | Hooper | 251/107 |
| 1,426,008 | 8/1922 | Posson | 251/107 |
| 2,301,378 | 11/1942 | Crista | 137/383 |
| 3,648,970 | 3/1972 | Hartmann et al. | 137/385 |
| 3,976,095 | 8/1976 | Koch et al. | 251/104 |
| 4,093,178 | 6/1978 | Hughes et al. | 251/110 |
| 4,208,033 | 6/1980 | Kesterman | 251/95 |
| 4,570,901 | 2/1986 | Koltgraver | 251/297 |
| 4,678,159 | 7/1987 | Gardner et al. | 251/101 |
| 4,747,427 | 5/1988 | Smith et al. | 137/270 |
| 4,770,388 | 9/1988 | Carman | 251/288 |

Primary Examiner—George L. Walton
Attorney, Agent, or Firm—Harness, Dickey & Pierce

[57] ABSTRACT

A portable tank for storage and transport of liquids has a bottom discharge opening closed by a discharge valve connected to the bottom of the tank. The discharge valve has a hollow valve body, a movable valve disk positioned within the body, and a handle connected to the valve disk extending through an opening in the valve body. The handle is rotatable to open and close the valve. A stationary locking plate is secured to the valve body and a locking member is movably mounted on the valve handle. The locking member is movable to and from a position in which the locking member is in an interference relationship with the locking plate locking the handle and, correspondingly, the valve disk in a predetermined position when the locking member is in the interference position.

8 Claims, 3 Drawing Sheets

DISCHARGE VALVE WITH HANDLE LOCK

BACKGROUND AND SUMMARY OF THE INVENTION

The present invention relates to portable tanks for storage and transport of liquids and, more particularly, to a discharge valve for a bottom discharge in such a portable tank.

Portable tanks for storage and transport of liquids typically have a bottom discharge valve for complete drainage of tank contents. The valve and associated connections are typically located near one edge so as to be readily accessible to the operator.

Butterfly or ball type valves are used on these tanks because of their generally compact and full throated design. The handle associated with these types of valves is generally rotated through an arc of approximately 90 degrees to move between the open and closed position. An elongated operating handle is typically positioned horizontally when the valve is closed and vertically when the valve is open.

Consequently, with the valve positioned at the edge and below the tank bottom, the valve handle lies in a horizontal position providing a convenient foot rest for a person standing adjacent the tank to rest his foot on. If a significant downward force is applied to the handle, the valve may be opened inadvertently discharging the contents of the tank onto the person's foot. Accordingly, it is desirable to provide a locking feature on valves of this type used in this particular application.

It is, therefore, an object of the present invention to provide a simple locking device for a tank discharge valve to prevent inadvertent movement of the valve handle from a predetermined position.

It is a further object of the present invention to provide a valve handle lock that is simple to operate and visually indicates the locked and unlocked position.

It is a still further object of the present invention to provide a readily recognizable visual message as to the position status of a tank discharge valve.

The discharge valve according to the present invention is particularly adapted for use in a metal, plastic or composite portable tank having a top wall, a bottom wall, upright sides, and a plurality of supporting legs which support the tank a given distance above the floor or other supporting surface. The discharge valve according to the present invention is positioned adjacent one of the sides and in the space between the floor and the bottom wall of the tank. The discharge valve may be of various internal construction such as a ball or butterfly type valve.

Although the following discussion describes a butterfly type valve as an example, the invention is not limited to this particular type of valve. The valve according to the present invention has a hollow body with a closable passage and has a mounting flange connected to the bottom wall at the discharge opening. A valve disk is movably supported in the passage within the hollow body. This valve disk is movable between an open position allowing passage of tank contents through the body and a closed position closing off the passage.

An operating handle is connected to the valve disk through an aperture in the hollow body via an operating shaft which moves the valve disk between the open and closed positions. A flat locking plate is bolted to the exterior of the valve body in a plane perpendicular to the axis of the shaft connecting the handle to the valve disk. A locking lever pivotally mounted on a pivot pin on the handle is movable to and from an interference relationship with the locking plate to lock the handle, shaft and valve disk in a predetermined position. This predetermined position is set by the structure of the locking plate.

The locking plate has an concave arcuate edge portion of a first radius which is centered a spaced distance from the locking plate in the plane of the locking plate. The center sets the predetermined position and is a predetermined radial distance from the axis. The locking plate also has, adjacent the concave arcuate edge portion, a convex arcuate edge portion of a second radius which is centered about the axis of the operating shaft.

The pivot pin is located on the handle the same predetermined distance from the axis as the center of the concave arcuate edge portion of the locking plate. The locking lever pivotally mounted on the pivot pin on the handle has a convex arcuate portion of the same first radius centered about the pivot pin. The locking lever also has a concave arcuate portion of a radius slightly greater than the second radius centered in the plane of the locking plate, spaced from the locking lever. The slight differences in radii provide clearance for relative movement between the locking lever and the locking plate.

When the handle is rotated to a position where the pivot pin is aligned with the center of the concave arcuate edge portion of the locking plate, the handle is in the predetermined position and the locking lever can be rotated into an interference relationship with the locking plate to prevent movement of the handle from the predetermined position.

The discharge valve according to the present invention having the concave arcuate edge portion of the locking plate having the first radius located so that the locking lever is engageable when the handle is in the closed position prevents inadvertent opening of the valve. Thus, the problem of a person putting his foot on the valve handle inadvertently opening the valve can be avoided.

Other objects, features and advantages of the present invention will become evident from a consideration of the following description when taken in conjunction with the accompanying drawing and the appended claims.

DESCRIPTION OF THE INVENTION

Figure 1:
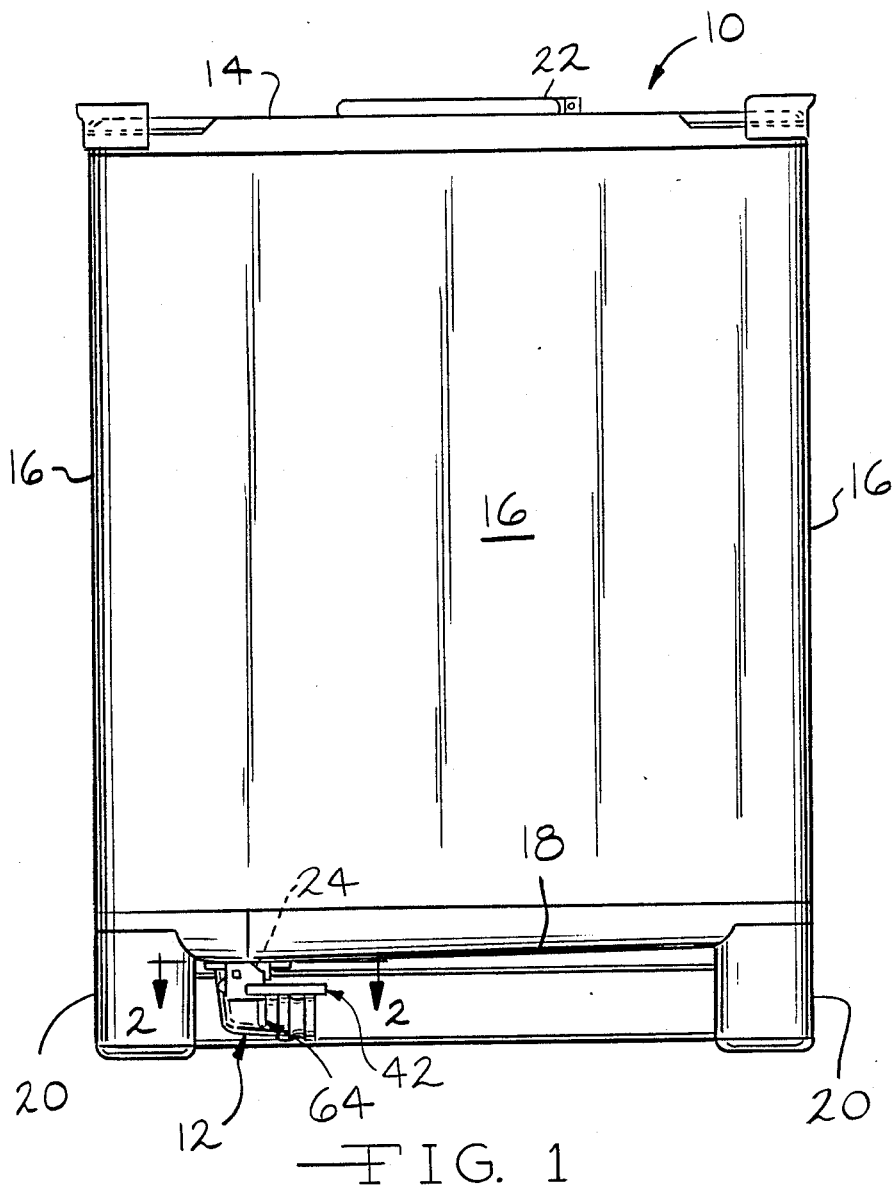
FIG. 1 is a side elevational view of a portable tank having a bottom discharge valve according to the present invention.

With reference to the drawing, a portable tank 10 for bulk liquid storage and transport having a valve assembly 12 according to the present invention is shown in FIG. 1. The tank 10 is generally rectangular in shape having a top wall 14, side walls 16, bottom wall 18 and downwardly extending legs 20. Tank 10 has a capped opening 22 in top wall 14 for filling the tank. Bottom wall 18 includes a discharge opening 24 for discharge of the tank contents through discharge valve assembly 12. Discharge opening 24 is positioned near an outside edge of bottom wall 18 and spaced between legs 20 so as to be easily accessible for operation and connection of hoses, etc. to the discharge valve assembly 12.

The discharge valve assembly 12 includes a hollow valve body 26 having a bore 28 therethrough and having a flange 30 at one end for mounting against bottom 18 around discharge opening 24. The other end of hollow valve body 26 is open.

Figure 2:
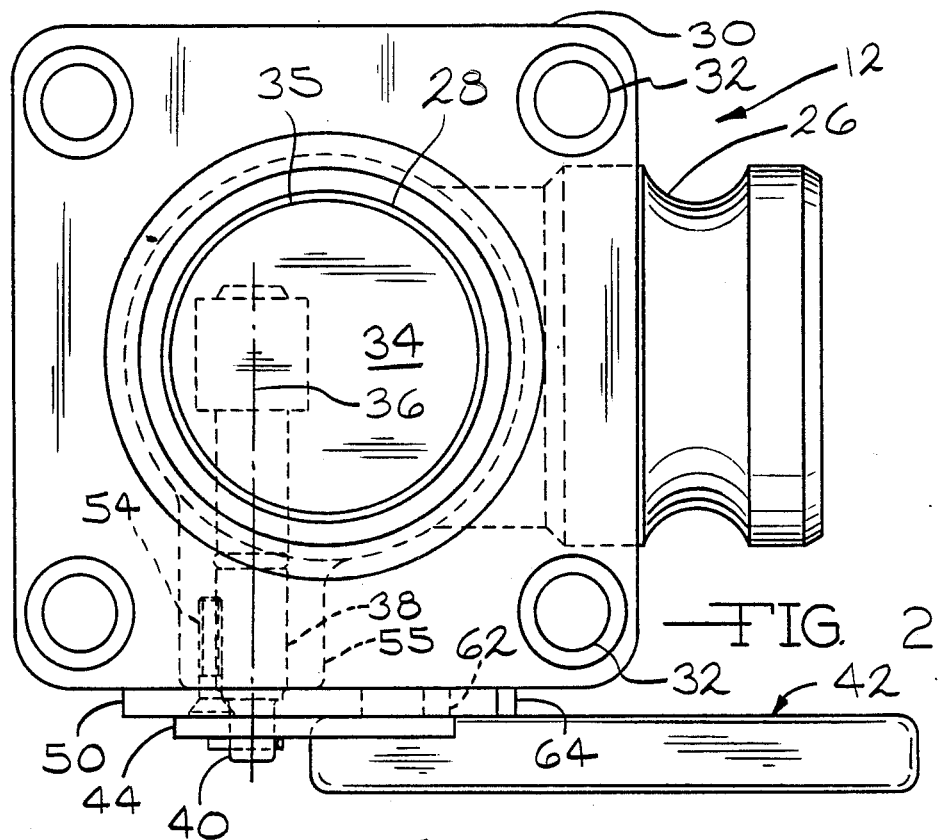
FIG. 2 is an enlarged plan view of the valve according to the present invention shown in the closed and locked position, taken on the line 2—2 in FIG. 1.

An enlarged plan view of the valve assembly 12 according to the present invention is shown in FIG. 2 clearly showing the generally square flange 30 which has four bolt holes 32 spaced at the corners of the flange 30 for bolting the valve body 26 to the bottom wall 18. Valve body 26 has a generally elbow shape as illustrated in the figures. Correspondingly, bore 28 passes vertically downward through flange 30 and makes a right angle bend to exit in a generally horizontal direction as shown in FIGS. 2 through 5.

Figure 3:
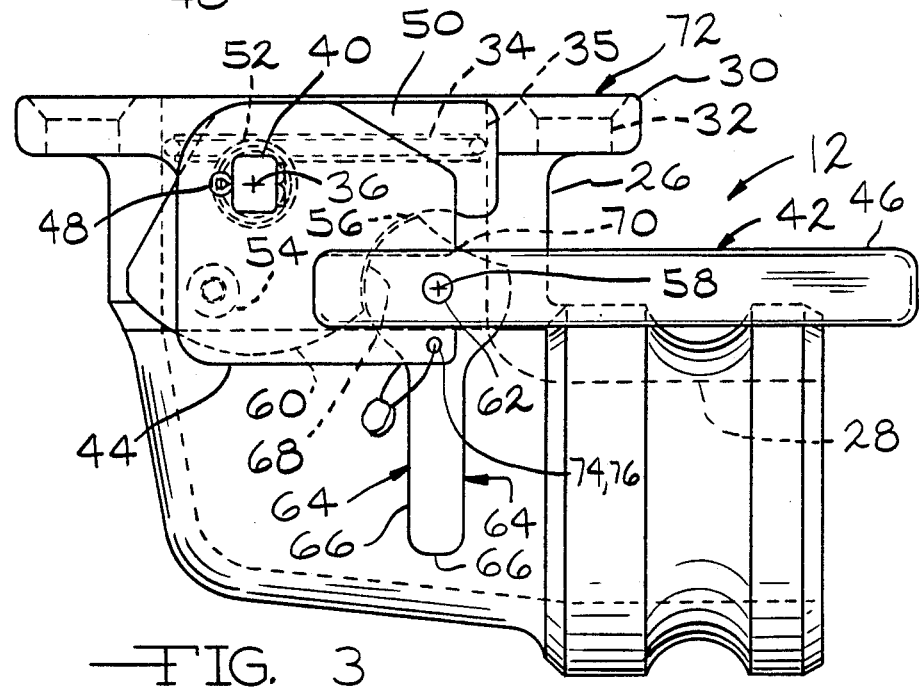
FIG. 3 is a side elevational view of the valve shown in FIG. 2.
Figure 4:
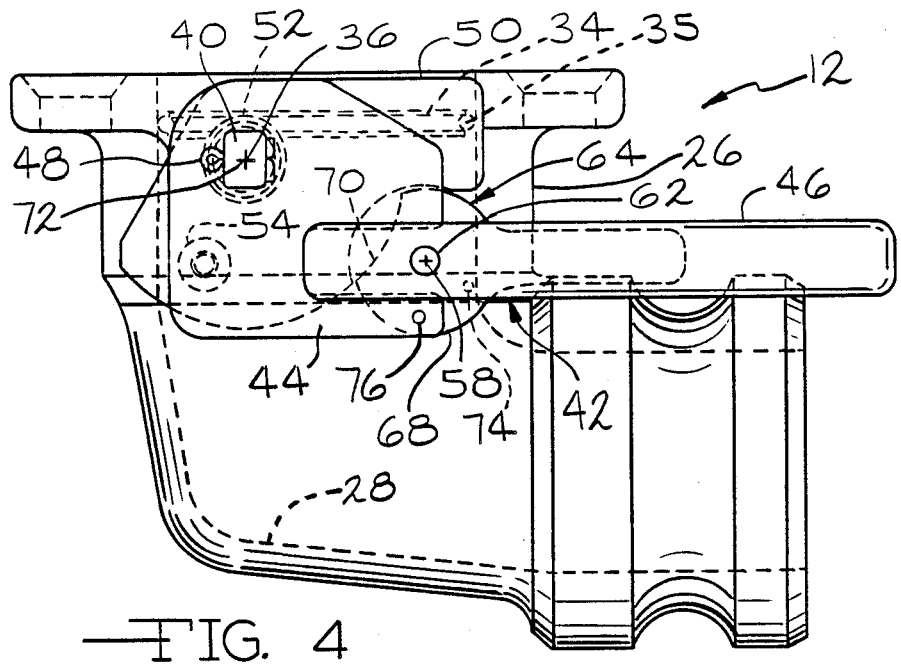
FIG. 4 is a side elevational view of the valve shown in FIG. 2 in the closed and unlocked position.

A movable valve disk 34 is positioned in the vertical portion of bore 28 so as to movably close bore 28. The valve disk 34 is shown in FIGS. 2, 3 and 4 in the closed position. Valve Disk 34 is circular and has an O-ring seal 35 which provides a positive liquid seal when valve disk 34 is in the closed position closing off bore 28. Valve disk 34 is rotatable about a horizontal axis 36 passing perpendicular to bore 28 through an aperture 38 in the wall of hollow valve body 26.

Figure 5:
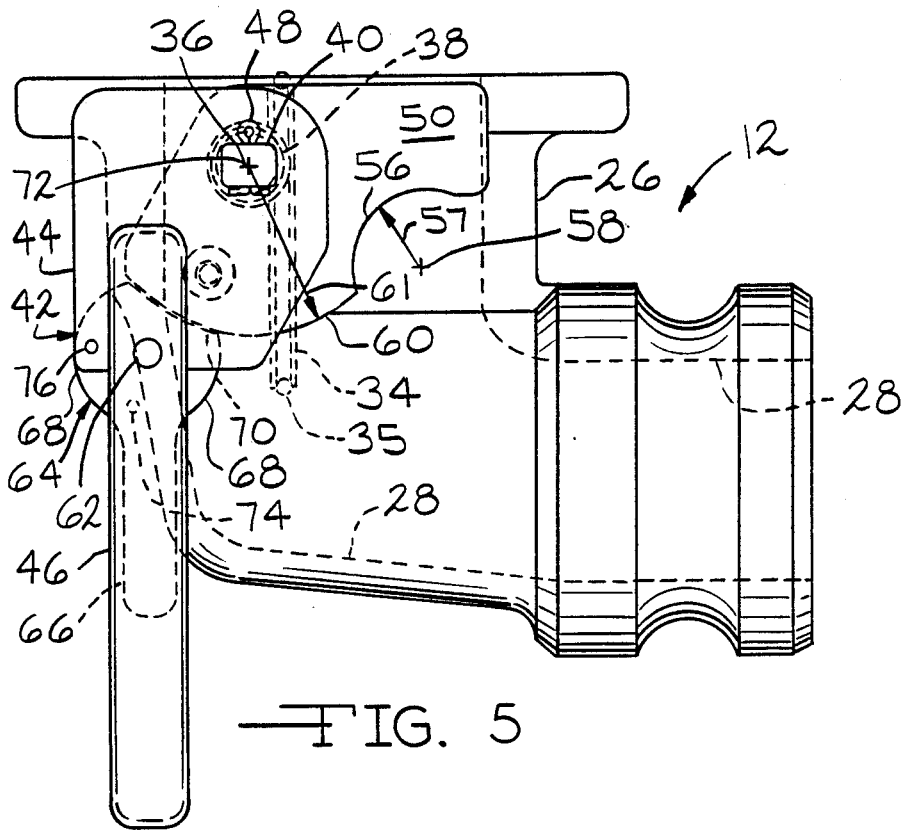
FIG. 5 is the same side view of the valve shown in FIGS. 3 and 4 in the open position.

An elongated operating shaft 40 is asymmetrically secured to valve disk 34 and extends through aperture 38 to the exterior of hollow valve body 26. Rotation of shaft 40 rotates valve disk 34 between the opened and closed positions as shown in FIGS. 5 and 3, respectively.

Shaft 40 extends through aperture 38 along axis 36. Attached to the outer end of shaft 40 is an operating handle 42 which has a mounting plate portion 44 and a handle portion 46. Mounting plate portion 44 has a square hole through which the free end of shaft 40 extends. Shaft 40 and mounting portion 44 are secured together by cotter pin 48. Thus, rotation of handle 42 causes rotation of shaft 40 and, in turn, rotation of valve disk 34 between a closed position as shown in FIGS. 2, 3 and 4 and an opened position as shown in FIG. 5.

Mounting plate portion 44 is a generally flat plate positioned perpendicular to axis 36. The handle portion 46 of handle 42 is fixed to mounting portion 44 and extends outward in the plane of mounting portion 44 to provide leverage for operating the valve.

Positioned parallel to mounting plate portion 44 and stationarily bolted to valve body 26 is a flat locking plate 50. Locking plate 50 is positioned adjacent and sandwiched between valve body 26 and mounting portion 44 of handle 42. Locking plate 50 is secured to valve body 26 by the combination of shaft 40 passing through a hole 52 in locking plate 50 and bolt 54 which secures locking plate 50 to a boss portion 55 of hollow valve body 26.

Locking plate 50 has an arcuate concave edge portion 56 having a first radius of curvature 57, the center 58 being spaced from locking plate 50 and spaced a predetermined distance from the axis 36. Adjacent concave arcuate edge portion 56 is a convex arcuate edge portion 60 having a second radius of curvature 61 centered on the axis 36.

A pivot pin 62 spaced from locking plate 50 projects parallel to axis 36 toward hollow body 26 from handle 42. The pivot pin 62 is located on handle 42 the same predetermined distance from the axis 36 as is the center 58 of the arcuate edge portion 56. Therefore, as the handle 42 is rotated about axis 36, the pivot pin 62 can be positioned to coincide with the center 58.

A locking lever member 64 is pivotally attached to pivot pin 62. Locking lever 64 has a handle portion 66, a convex arcuate portion 68 having a radius of curvature slightly less than the first radius of curvature 57 centered on pivot pin 62 and a concave arcuate portion 70 having a center 72 a spaced distance from locking lever member 64.

The radius of curvature of concave arcuate portion 70 is slightly greater than the second radius of curvature 61. When locking lever 64 is positioned with handle portion 66 parallel to handle 46, the center 72 coincides with axis 36 and a clearance exists between lever 64 and locking plate 50 as shown in FIG. 4.

Locking lever member 64 is shown in FIGS. 1, 2 and 3 in the locked position whereby convex arcuate portion 68 is in an interference relation with concave arcuate portion 56 of locking plate 50 to prevent rotation of handle 42 about axis 36. This interference relationship between convex arcuate portion 68 and concave arcuate edge portion 56 locks valve disk 34 in the closed position. Only in this position of handle 42 do the locations of pivot pin 62 and center 58 of concave arcuate edge portion 56 coincide. At only this location of handle 42 can locking lever 64 be rotated about pivot pin 62.

Correspondingly, when locking lever 64 is rotated to position the center 72 of concave arcuate portion 70 so as to coincide with axis 36, as shown in FIG. 4, handle 42 can be rotated about axis 36 to open the valve as shown in FIG. 5. Thus, only when the center 72 of concave arcuate portion 70 coincides with axis 36 is the locking lever member 64 disengageable from the interference relationship between portions 68 and 56. Only in this position may handle 42 and consequently valve disk 34 be moved from the closed position.

The valve position at which locking lever member 64 may be engaged is determined by the position of the center of curvature 58 of arcuate edge portion 56. Consequently, the predetermined position of center 58 with respect to axis 36 dictates the predetermined position at which the valve disk may be locked. As illustrated in FIGS. 2 through 5, this position is with the valve closed. Other positions may be provided as the predetermined position by changing the angular position of center 58.

As can be seen in FIGS. 3 and 4, a person standing adjacent the tank 10 with his foot resting on handle 42 cannot inadvertently open discharge valve assembly 12 without deliberately moving the locking member 64 from the vertically downward position as shown in FIG. 3 to the horizontal position as shown in FIG. 4. Consequently, inadvertent discharge of tank contents is thus prevented.

Locking member 64 has a hole 74 through the arcuate portion 68. The hole 74 is spaced from center 58 so as to overlie another hole 76 in mounting plate portion 44 of handle 42 when handle 42 is in the closed position and locking member 64 is in the vertical locked position as shown in FIG. 3. A lock wire seal 78 is passed through holes 74 and 76 to provide a visual indication of whether or not the valve has been moved from the locked position. This lock wire provides a tamper evident seal to easily visually determine the integrity of tank contents after storage or transport.

While the above description constitutes a preferred embodiment of the present invention, it will be appreciated that the inventive concept of interfering plate members on the handle of a ball or butterfly valve to achieve a locking relationship in a predetermined position is susceptible to modification, variation and change without departing from the proper scope and fair meaning of the accompanying claims.

What is claimed is:

1. A discharge valve for a portable tank for storage and transport of liquids comprising:
   a hollow valve body having a bore therethrough for passage of said liquid and an aperture in said body along an axis transverse of said bore;
   an operating shaft member in said bore oriented along said axis and having an end extending through said aperture;
   a valve disk fixed to said shaft within said bore, said valve disk being movable with said shaft about said axis between a closed position closing said bore and an open position allowing fluid passage through said bore;
   a stationary locking plate member fastened to the exterior of said body adjacent said aperture in a plane generally perpendicular to said axis, said plate member having a concave arcuate edge portion with a first radius of curvature in said plane having a center spaced from said plate a predetermined distance from said axis and a convex arcuate edge portion with a second radius of curvature in said plane centered about said axis;
   an elongated handle having one end fastened to said end of said shaft member for rotating said shaft to move said disk between said open and closed positions, said handle having an outwardly projecting pivot pin member spaced from said one end said predetermined distance from said axis, said pin member projecting parallel to said axis; and
   a locking lever for locking said handle in a predetermined position, said lever being rotatably secured to said pin member and lying in said plane adjacent said locking plate member, said lever having an elongated handle portion, a convex arcuate portion in said plane centered about said pivot pin member, and a concave arcuate portion having a center in said plane spaced from said lever, said lever being operable to engage said locking plate member locking said handle in said predetermined position when said handle is rotated to locate said pivot pin member at the center of curvature of said concave arcuate edge portion of said plate, said handle being movable from said predetermined position when said lever is rotated to position said center of said concave arcuate portion of said lever on said axis.

2. The valve according to claim 1 wherein said predetermined position orients said disk to close and bore.

3. The valve according to claim 2 wherein said convex arcuate portion of said lever engages said concave arcuate edge portion of said plate to lock said handle in said predetermined position.

4. The valve according to claim 3 wherein said pivot pin projects inward toward said body, said lever and said locking plate member being sandwiched between said body and said handle.

5. The valve according to claim 1 wherein said handle portion is positioned parallel to said handle when said center of said concave arcuate portion of said lever is on said axis.

6. A discharge valve for a liquid storage and transport tank comprising:
   a hollow valve body having a passage for flow of said liquid therethrough;
   a rotatable closure element disposed within said passage and rotatable about an axis transverse to said passage between positions opening and closing said passage to liquid flow;
   a handle operatively connected to said closure element for rotating said element, said handle lying in a first plane substantially perpendicular to said axis and having a pivot pin member extending from said handle substantially parallel to said axis at a predetermined distance from said axis;
   a stationary locking plate secured to said body and lying in a second plane substantially parallel to said first plane;
   a locking member mounted to said handle and lying in said second plane, said locking member being rotatably mounted to said handle about said pivot pin member, when said handle is in a predetermined position, said locking member being movable to a position in which said locking member is in an interference relationship with said locking plate to lock said handle in said predetermined position
   and in a non-interference relationship said locking member has an outer surface edge that slides along an outer surface edge of said locking plate when said locking member has been rotated to a second predetermined position for free handle movement.

7. The discharge valve of claim 6 wherein said predetermined position of said handle corresponds to the closed position of said closure element.

8. The discharge valve of claim 6 wherein:
   said locking plate has a concave arcuate edge portion having a center lying in said second plane spaced said predetermined distance from said axis and a convex arcuate edge portion having a center at the intersection of said axis and said second plane;
   said locking member having a convex arcuate portion centered about said pivot pin member and a concave arcuate edge portion with a center spaced from said locking member wherein said locking member is operable to interfere with said locking plate when said handle is moved to said predetermined position;
   in said predetermined handle position, said pivot pin member is at the center of curvature of said locking plate concave arcuate edge portion.

* * * * *